(12) United States Patent
Mishra et al.

(10) Patent No.: US 10,079,821 B2
(45) Date of Patent: Sep. 18, 2018

(54) SYSTEM AND METHOD FOR WEB SINGLE SIGN-ON THROUGH A BROWSER EXTENSION

(71) Applicant: ILANTUS TECHNOLOGIES PVT. LTD., Bangalore (IN)

(72) Inventors: Ashutosh Kumar Mishra, Bangalore (IN); Sateesh Kulkarni, Bangalore (IN)

(73) Assignee: ILANTUS TECHNOLOGIES PVT. LTD., Bangalore (IN)

( * ) Notice: Subject to any disclaimer, the term of this patent is extended or adjusted under 35 U.S.C. 154(b) by 283 days.

(21) Appl. No.: 15/096,735

(22) Filed: Apr. 12, 2016

(65) Prior Publication Data

US 2016/0301685 A1    Oct. 13, 2016

(51) Int. Cl.
*H04L 29/06* (2006.01)
*H04L 29/08* (2006.01)
*H04L 12/58* (2006.01)

(52) U.S. Cl.
CPC ........ *H04L 63/0815* (2013.01); *H04L 51/046* (2013.01); *H04L 67/02* (2013.01)

(58) Field of Classification Search
CPC .... H04L 63/0815; H04L 51/046; H04L 67/02
See application file for complete search history.

(56) References Cited

U.S. PATENT DOCUMENTS

| | | | | |
|---|---|---|---|---|
| 7,237,024 B2 * | 6/2007 | Toomey | ................. | H04L 63/08 709/224 |
| 8,528,049 B1 * | 9/2013 | Khen | ..................... | G06F 21/36 382/119 |
| 8,612,305 B2 * | 12/2013 | Dominguez | ........... | G06Q 20/40 705/26.35 |
| 8,701,199 B1 * | 4/2014 | Dotan | ..................... | H04L 63/08 726/25 |
| 9,338,173 B2 * | 5/2016 | Norman | .................. | H04L 63/14 |
| 9,455,997 B2 * | 9/2016 | Shulman | ............. | H04L 63/1416 |

* cited by examiner

*Primary Examiner* — Beemnet Dada
(74) *Attorney, Agent, or Firm* — Barry Choobin; Patent 360 LLC

(57) ABSTRACT

The embodiments herein disclose a system and method for enabling single sign-on for a user on a plurality of web applications through a browser extension. The system includes a browser extension installed on a client device and a server. The server includes a receiving module, a parsing module, an authentication module, a generating module, and a database.

12 Claims, 3 Drawing Sheets

SYSTEM AND METHOD FOR WEB SINGLE SIGN-ON THROUGH A BROWSER EXTENSION

CROSS REFERENCE TO RELATED APPLICATIONS

Benefit is claimed under 35 U.S.C. 119(a)-(d) to Foreign application Serial No. 708/CHE/2015 filed in India entitled "A SYSTEM AND METHOD FOR WEB SINGLE SIGN-ON THROUGH BROWSER EXTENSION", on Apr. 13, 2015, which is herein incorporated in its entirety by reference for all purposes.

BACKGROUND

Technical Field

The embodiments herein are generally related to system and method for single sign-on on a computing device. The embodiments herein are particularly related to a system and method to enable single sign-on using an internet browser. The embodiments herein are more particularly related to a system and method to enable single sign-on into a plurality of applications through an extension application for an internet browser.

Description of the Related Art

Single Sign-on is a mechanism for logging on to multiple digital applications through one centralized application and single login credential. This is greatly beneficial to the users who handle multiple digital applications since the single sign-on users are saved from a trouble of remembering multiple login credentials.

The current approaches for Single Sign-On (SSO) to web applications are achieved using Access Managers, Reverse Proxies that involve changes to the application structure. The process is complicated, time-consuming, and such approaches are limited to certain application patterns. With emerging technologies and humungous web solutions, current approaches are not efficient providing SSO to these applications. In addition to the above, these approaches require niche skill set as well.

The current methods also include the additional processes such as obtaining hidden and dynamic parameters at runtime to complete sign-on to a web application, loading an application in the local frame of the sign-on solution and developing the user internet browser extensions that interact with any web applications loaded in the browser. However, these methods have shortcomings such as an inability of the single sign-on application to submit login credentials, inability to access the dynamic attributes of the application to be loaded and change in JavaScript code of required extension to be rebuilt and redeployed.

Hence, there is a need for a system and method to enable effective and easy single sign-on for users into a plurality of applications using an internet browser.

The above-mentioned shortcomings, disadvantages and problems are addressed herein, which will be understood by reading and studying the following specification.

OBJECTS OF THE EMBODIMENTS HEREIN

The primary object of the embodiments herein is to provide a system and method to enable a single sign-on into a plurality of digital applications through an extension application for internet browsers.

Another object of the embodiments herein is to provide a system and method to enable a single sign-on to a plurality of web applications without effecting any changes in the application to be accessed.

Yet another object of the embodiments herein is to provide a system and method to enable a single sign-on using internet browser extension that parses an application login page and performs sign on.

Yet another object of the embodiments herein is to provide a system and method to enable single sign-on using internet browser extension that retrieves dynamic authentication data from internet applications and automatically enables sign-on to the respective applications.

Yet another object of the embodiments herein is to provide a system and method that enables single sign-on to a plurality of web applications and generates XML data and digital scripts for single sign-on in the background while onboarding a plurality of applications.

Yet another object of the embodiments herein is to provide a system and method that enables single sign-on to a plurality of web applications and encapsulates the complexity of the business logic from the user onboarding the application.

Yet another object of the embodiments herein is to provide a system and method to enable single sign-on to a plurality of web applications through standard and secure HTTP protocol for fetching the script needed for single sign-on and avoiding complicated interactions.

Yet another object of the embodiments herein is to provide a system and method to enable single sign-on to a plurality of web applications such as legacy applications, enterprise applications, emerging web standards such as HTML5, B2C based applications etc.

Yet another object of the embodiments herein is to provide a system and method to enable single sign-on to a plurality of web applications and adapts to the changes made to target applications so that the system is modified at any time with minimal downtime.

Yet another object of the embodiments herein is to provide a system and method to enable a single sign-on to a plurality of web applications by externalizing JavaScript control to the user and enable users to edit the JavaScript without the need of any specialized skills.

Yet another object of the embodiments herein is to provide a system and method to enable a single sign-on to a plurality of web applications by externalizing JavaScript control to the user and enable users to edit the JavaScript without the need of re-installing the browser extension every time.

Yet another object of the embodiments herein is to provide a system and method to enable single sign-on to a plurality of web applications through an extension that allows editing or updating the JavaScript for one internet browser by accessing the extension in another internet browser.

These and other objects and advantages of the embodiments herein will become readily apparent from the following detailed description taken in conjunction with the accompanying drawings.

SUMMARY

The various embodiments herein provide a method and system for enabling single sign-on for a user on a plurality of web applications through a browser extension. The system comprises a receiving module, a parsing module, an authentication module, a generating module, and a database.

According to an embodiment herein, the receiving module is configured to receive pre-determined login credentials of a plurality of web applications. The receiving module receives the pre-determined login credentials of the plurality of web applications through the browser extension. The pre-determined login credentials include the details of the web application and the details of the user including but not limited to a registered e-mail identity, and a password. According to an embodiment herein, the receiving module prompts the user to enter the predetermined login credentials of the plurality of web applications for the first time.

According to an embodiment herein, the parsing module is configured to parse the plurality the pre-determined login credentials of web applications login page for enabling the single sign-on. The parsing of the plurality of web applications is enabled using a plurality of standard parsing techniques. The parsing module is communicably coupled to the receiving module.

According to an embodiment herein, the authentication module is configured to authenticate the pre-defined login credentials of the plurality of web applications. The authentication module authenticates each of the web applications by verifying the received pre-defined login credentials with the application program interface of the web application. According to an embodiment herein, the authentication module is communicably coupled with the parsing module.

According to an embodiment herein, the generating module is configured to generate an extensible markup language (XML) data and a plurality of digital scripts. The generating module generates the XML data and the plurality of digital scripts as a background process while enabling the single sign-on. According to an embodiment herein, the generating module is communicably coupled to the authentication module.

According to an embodiment herein, the database is configured to store the authenticated login credentials of a plurality of web applications, and the database is communicably coupled with the generating module.

According to an embodiment herein, the receiving module receives the pre-determined login credentials of the user through an externalized JavaScript. The externalized JavaScript enables the users to edit the JavaScript without re-installing the browser extension each time.

According to an embodiment herein, a local administrator of the single sign-on alters the externalized JavaScript optionally when at one web application changes the process of receiving the pre-determined login credentials.

According to an embodiment herein, the browser extension retrieves the authentication details from a plurality of internet application for enabling the single sign-on to each of the web application.

According to an embodiment herein, the receiving module fetches the plurality of digital scripts through a standard and secure HyperText Transfer protocol (HTTP).

According to an embodiment herein, the plurality of web applications are selected from a group consisting of a plurality of legacy applications, enterprise applications, webmails, online retail sales, online auctions, wikis, and instant messaging services.

According to an embodiment herein, the system accesses the plurality of web applications directly when the browser extension is disabled. The disablement of the web browser for enabling single sign-on is due to various reasons including, but not limited to a server maintenance, non-working of the server, voluntary disablement of the browser extension by the user, non-allowance for fetching the details of the web application, and the like.

The various embodiments herein provide a method for enabling a single sign-on for a user on a plurality of web applications through a browser extension. The method comprises receiving predetermined login credentials of a plurality of web applications through a receiving module, authenticating the received pre-determined login credentials through an authenticating module, generating an extensible markup language (XML) data and a plurality of digital scripts through a generating module, parsing the received information of the plurality of web applications to identify the pre-determined login credentials of the user, and storing a plurality of details related to the single sign-on using a database.

According to an embodiment herein, the predetermined login credentials of a plurality of web applications are received through a browser extension. The pre-determined login credentials of a plurality of web applications include at least a registered e-mail identity and a password, and the receiving module prompts the user to enter the login credentials of the plurality of web applications for the first time.

According to an embodiment herein, the authentication is enabled by verifying the received pre-determined login credentials with an application interface of each of the web applications.

According to an embodiment herein, the generated XML data and the plurality of digital scripts are processed in the background while enabling the single sign-on process.

According to an embodiment herein, the parsing is enabled through a parsing module. The received information is parsed through a plurality of standard parsing techniques.

According to an embodiment herein, the plurality of details include login credentials of the user and metadata of the user.

According to an embodiment herein, the predetermined login credentials are received through an externalized JavaScript. The externalized JavaScript enables the user to edit the JavaScript without re-installing the browser extension each time.

According to an embodiment herein, a local administrator of the single sign-on application alters the externalized JavaScript when the web application changes the process of receiving the login credentials.

According to an embodiment herein, the method further includes fetching the plurality of digital scripts through a standard and secure Hyper Text Transfer Protocol (HTTP).

According to an embodiment herein, the plurality of web applications are selected from a group consisting of legacy applications, enterprise applications, webmails, online retail sales, online auctions, wikis, and instant messaging services.

According to an embodiment herein, the method further includes accessing the plurality of web applications directly when the browser extension is disabled.

Although the embodiments herein are described with various specific embodiments, it will be obvious for a person skilled in the art to practice the embodiments herein with modifications.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
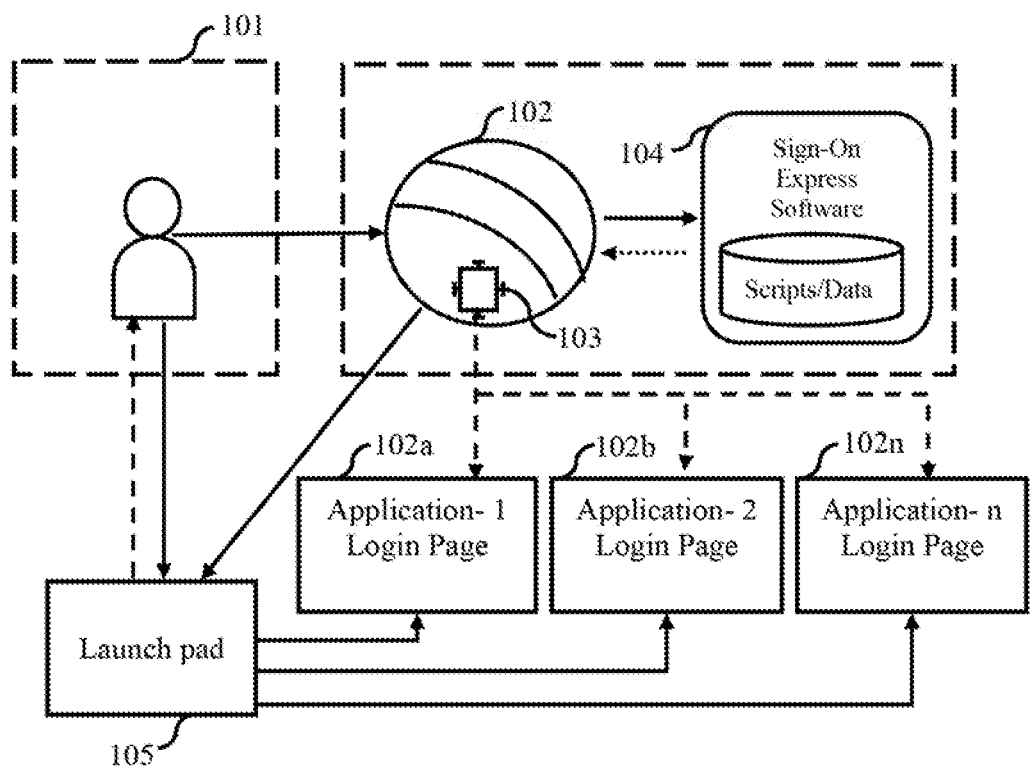
FIG. 1 illustrates a block diagram of a system provided with a user interface for enabling single sign-on into a plurality of applications through an extension application for an internet browser, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide a method and system for enabling single sign-on for a user on a plurality of web applications through a browser extension. The system comprises a receiving module, a parsing module, an authentication module, a generating module, and a database.

The receiving module is configured to receive pre-determined login credentials of a plurality of web applications. The receiving module receives the pre-determined login credentials of the plurality of web applications through the browser extension. The pre-determined login credentials include the details of the web application and the details of the user including but not limited to a registered e-mail identity, and a password. According to an embodiment herein, the receiving module prompts the user to enter the predetermined login credentials of the plurality of web applications for the first time.

The parsing module is configured to parse the plurality the pre-determined login credentials of web applications login page for enabling the single sign-on. The parsing of the plurality of web applications is enabled using a plurality of standard parsing techniques. The parsing module is communicably coupled to the receiving module.

The authentication module is configured to authenticate the pre-defined login credentials of the plurality of web applications. The authentication module authenticates each of the web applications by verifying the received the pre-defined login credentials with the application program interface of the web application. According to an embodiment herein, the authentication module is communicably coupled with the parsing module.

The generating module is configured to generate an extensible markup language (XML) data and a plurality of digital scripts. The generating module generates the XML data and the plurality of digital scripts as a background process while enabling the single sign-on. According to an embodiment herein, the generating module is communicably coupled to the authentication module.

The database is configured to store the authenticated login credentials of a plurality of web applications, and the database is communicably coupled with the generating module.

According to an embodiment herein, the receiving module receives the pre-determined login credentials of the user through an externalized JavaScript. The externalized JavaScript enables the users to edit the JavaScript without re-installing the browser extension each time.

According to an embodiment herein, a local administrator of the single sign-on alters the externalized JavaScript optionally when at one web application changes the process of receiving the pre-determined login credentials.

According to an embodiment herein, the browser extension retrieves the authentication details from a plurality of internet application for enabling the single sign-on to each of the web application.

According to an embodiment herein, the receiving module fetches the plurality of digital scripts through a standard and secure HyperText Transfer protocol (HTTP).

According to an embodiment herein, the plurality of web applications are selected from a group consisting of a plurality of legacy applications, enterprise applications, webmails, online retail sales, online auctions, wikis, and instant messaging services.

According to an embodiment herein, the system accesses the plurality of web applications directly when the browser extension is disabled. The disablement of the web browser for enabling single sign-on is due to various reasons including, but not limited to a server maintenance, non-working of the server, voluntary disablement of the browser extension by the user, non-allowance for fetching the details of the web application, and the like.

The various embodiments herein provide a method for enabling a single sign-on for a user on a plurality of web applications through a browser extension. The method comprises receiving predetermined login credentials of a plurality of web applications through a receiving module, authenticating the received pre-determined login credentials through an authenticating module, generating an extensible markup language (XML) data and a plurality of digital scripts through a generating module, parsing the received information of the plurality of web applications to identify the pre-determined login credentials of the user, and storing a plurality of details related to the single sign-on using a database.

According to an embodiment herein, the predetermined login credentials of a plurality of web applications are received through a browser extension. The pre-determined login credentials of a plurality of web applications include at least a registered e-mail identity and a password, and the receiving module prompts the user to enter the login credentials of the plurality of web applications for the first time.

According to an embodiment herein, the authentication is enabled by verifying the received pre-determined login credentials with an application interface of each of the web applications.

According to an embodiment herein, the generated XML data and the plurality of digital scripts are processed in the background while enabling the single sign-on process.

According to an embodiment herein, the parsing is enabled through a parsing module. The received information is parsed through a plurality of standard parsing techniques.

According to an embodiment herein, the plurality of details include login credentials of the user and metadata of the user.

According to an embodiment herein, the predetermined login credentials are received through an externalized JavaScript. The externalized JavaScript enables the user to edit the JavaScript without re-installing the browser extension each time.

According to an embodiment herein, a local administrator of the single sign-on application alters the externalized JavaScript when the web application changes the process of receiving the login credentials.

According to an embodiment herein, the method further includes fetching the plurality of digital scripts through a standard and secure Hyper Text Transfer Protocol (HTTP).

According to an embodiment herein, the plurality of web applications are selected from a group consisting of legacy applications, enterprise applications, webmails, online retail sales, online auctions, wikis, and instant messaging services.

According to an embodiment herein, the method further includes accessing the plurality of web applications directly when the browser extension is disabled.

The embodiments herein provide a system and method to enable single sign-on into a plurality of applications through an extension application for an internet browser. The system enables single sign-on without effecting any changes in the application to be accessed. The embodiments herein parse an application login page and retrieves dynamic authentication data from internet applications. The embodiments herein enable modification of browser JavaScript at any time with minimal downtime and enables users to edit the JavaScript without requiring any specialized skills. The system is fully compatible with a plurality of web applications and allows editing or updating the JavaScript for one internet browser by accessing the extension in another internet browser. The embodiments herein overcome an inability to access the dynamic attributes of applications and provides an efficient and easy method for single sign-on.

According to one embodiment herein, a system and method to enable single sign-on without effecting any changes in the application to be accessed, is provided. The system parses an application login page and performs sign on by identifying the login fields and filling the authentication data for web applications. The system also generates XML data and scripts for sign-on in the background while on boarding a plurality of applications.

According to one embodiment herein, an internet browser extension to enable single sign-on, which easily adapts to the changes made to target applications, is provided. The JavaScript generated browser extension is modified at any time with a minimal downtime. The system uses standard and secure HTTP protocol for fetching the script needed for single sign on and avoiding any complicated interactions and encapsulates the complexity of the business logic from the user onboarding the application.

According to one embodiment herein, an internet browser extension is provided to enable an editing or updating the JavaScript for one internet browser by accessing the extension in another internet browser. The system is fully compatible with a plurality of web applications such as legacy applications, enterprise applications, emerging web standards such as HTML5, B2C based applications etc. The system also externalizes JavaScript control to the user and enables the users to edit the JavaScript without requiring specialized skills. The system is ready-to-use, lightweight and helps organizations and individuals to adapt to changing applications environment in an efficient way.

According to one embodiment herein, a system and method for enabling single sign-on into a plurality of applications through an extension application for an internet browser are provided. The system comprises, at least, one internet browser, a single sign-on browser extension and a plurality of internet applications. The single sign-on browser extension enables the users to login to a plurality of internet applications by enabling the users to provide at least one set of login credentials and automatically filling in the respective credentials for logging into the plurality of internet applications.

According to one embodiment herein, the process steps comprised in the method for single sign-on into a plurality of applications through an extension application for an internet browser is as follows. A user accesses any one of web browser extensions and authenticates just once using predefined credentials. Once authentication is verified, the user is provided an access to a launch pad provided in the system. The user launches an application from the launch pad. An application login page is loaded and an SXP extension is used to fetch the JavaScript from SXP server. SXP extension executes the JavaScript and injects the user's credentials. The user lands on applications welcome page.

FIG. 1 illustrates the user interface in a system and method for enabling single sign-on into a plurality of applications through an extension application for an internet browser, according to an embodiment herein. The implementation comprises, at least, one user 101, at least, one internet browser 102, single sign-on browser extension 103, at least, one server module 104 and a plurality of internet applications 102a, 102b . . . 102n and a launch pad 104. The software comprising the scripts and data to enable single sign-on is installed in server module 104. The user 101 accesses single sign-on web browser extension 103 and authenticates just once using predefined credentials. Once authentication is verified, the user is provided access to a launch pad 104. The single sign-on browser extension 103 enables the users to login to a plurality of internet applications 103a, 103b . . . 103n through the launch pad 104. The user 101 provides just one set of login credentials to access the launch pad 104 and are then enabled to log-on to a plurality of internet applications 103a, 103b . . . 103n.

Figure 2:
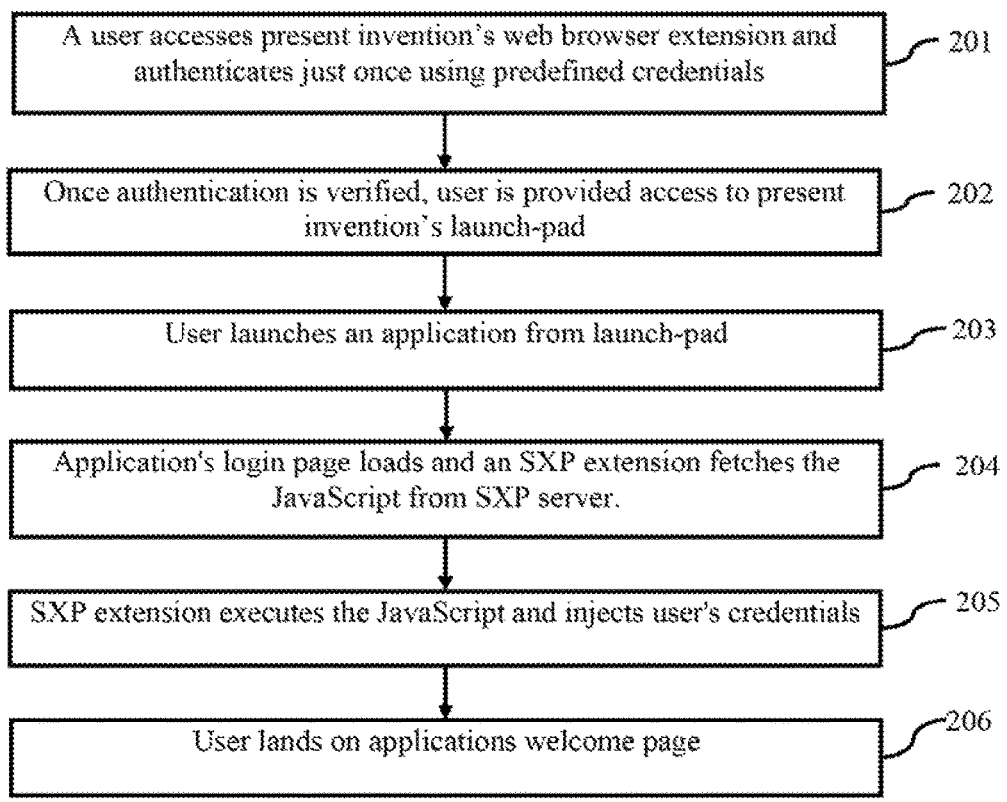
FIG. 2 illustrates a process flow chart explaining the method for single sign-on into a plurality of applications through an extension application for an internet browser according to an embodiment herein.

FIG. 2 illustrates a flow chart explaining the method for single sign-on into a plurality of applications through an extension application for an internet browser, according to an embodiment herein. The method comprises the following steps. A user accesses a web browser extension and authenticates just once using predefined credentials (201). Once authentication is verified, the user is provided access to present a launch pad (202). The user launch an application from the launch pad (203). Application's login page is loaded. An SXP extension fetches the JavaScript from SXP server (204). The SXP extension executes the JavaScript and injects user's credentials (205); User lands on applications welcome page (206).

Figure 3:
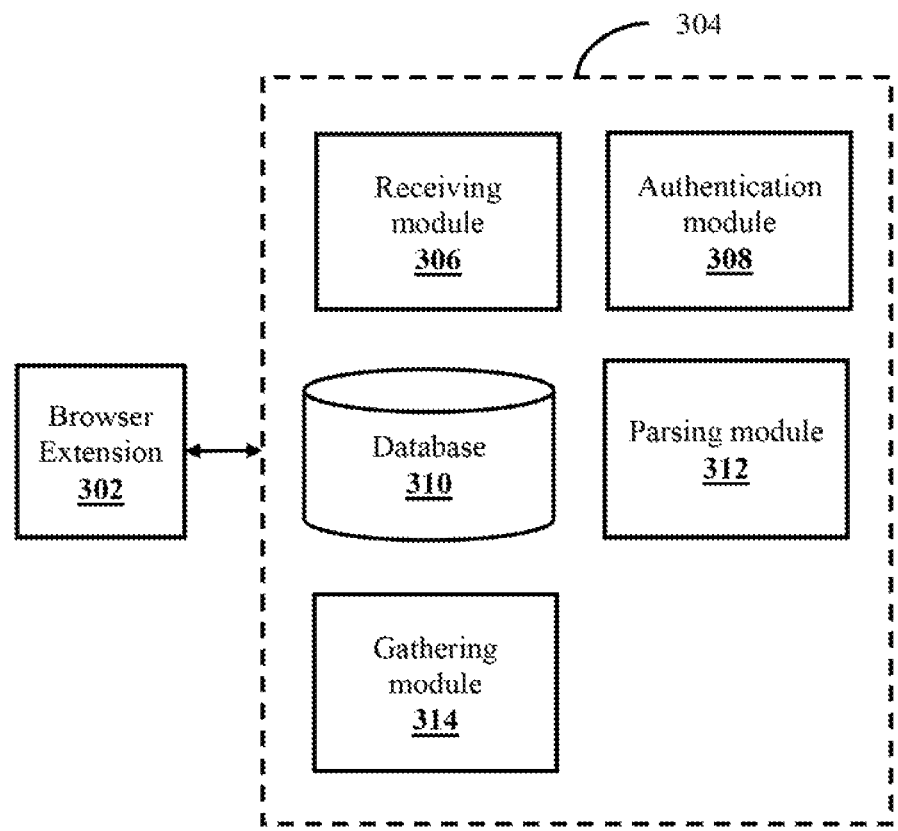
FIG. 3 illustrates a block diagram of a system for enabling single sign-on into a plurality of applications through an extension application for an internet browser, according to an embodiment herein.

FIG. 3 illustrates a block diagram for enabling single sign-on into a plurality of applications through an extension application for an internet browser, according to an embodiment herein. The block diagram includes a browser extension 302, and a server 304. The server 304 includes a receiving module 306, an authentication module 308, a database 310, a parsing module 312, and a gathering module 314.

The browser extension 302 is installed on the client device. The browser extension 302 is a plug-in that extends the functionality of a web browser. According to an embodiment herein, the browser extension 302 is authored using web technologies such as HTML, JavaScript, and CSS. The browser extension 302 is connected to the server 304 for enabling single sign-on procedure.

The receiving module 306 receives the details of the web applications that has to be enabled using single sign-on. The receiving module 306 receives the pre-determined login credentials of the plurality of web applications through the browser extension 302. According to an embodiment herein, the predetermined login credentials include are but not limited to e-mail identity, password, metadata of the device, and the metadata of the user. According to an embodiment herein, the receiving module 306 prompts the user to enter the predetermined credentials of the user for the first time. According to an embodiment herein, the receiving module 306 fetches the pre-determined login credentials through auto-fill techniques. The receiving module 306 is communicably coupled with the parsing module 308.

The parsing module 308 receives the details from the receiving module 304 and parses the plurality of pre-determined login credentials of the web application's login page for enabling the single sign-on. According to an embodiment herein, the parsing module 308 uses a plurality of standard parsing techniques for identifying the pre-determined login credentials of the web application.

Once the parsing module 308 parses the pre-determined login credentials, the authentication module 310 authenticates the pre-defined login credentials of the plurality of web applications. The authentication module 310 authenticates each of the web applications by verifying the received pre-defined login credentials with the application interface of the web application. According to an embodiment herein, the authentication module 310 notifies the user when the authentication for a particular web application fails. The authentication module 310 is communicably coupled with the parsing module 308.

The generating module 312 generates an extensible markup language data (XML) and a plurality of digital scripts. According to an embodiment herein, the generating module 312 generates the XML data and the plurality of digital scripts as a background process while enabling the single sign-on. According to an embodiment herein, the generating module 312 is communicably coupled with the authentication module.

The database 314 is configured to store the authenticated pre-determined login credentials of a plurality of web applications. According to an embodiment herein, the database also stores the metadata of the user and the device. According to an embodiment herein, the predetermined login credentials of the web applications are encrypted and stored using a plurality of encryption techniques. The example of the encryption techniques includes but are not limited to AES-256 standard. According to an embodiment herein, the database 314 is communicably coupled with the generating module 312. According to an embodiment herein, the key to encrypt and decrypt the user credentials is unique per installation of the single sign-on procedure and is generated at the time of the installation of the browser extension 302.

According to an embodiment herein, the user provides the pre-determined credentials for the first time when initiating the single sign-on and the pre-determined login credentials are stored in the database 314. According to an embodiment herein, when the stored pre-determined login credentials expire the user has an option to reset the credentials via the interface of the single sign-on. Further, the user has an option to view the login credentials for the particular web application; the "Reveal Password" option is activated. The "Reveal Password" option allows the user to re-authenticate the single sign-on solution.

The embodiments herein provide a system and method to enable single sign-on into a plurality of applications through an extension application for an internet browser. The currently used methods have shortcomings such as the inability of the single sign-on application to submit login credentials, inability to access the dynamic attributes of the application to be loaded and change in JavaScript code of required extension to be rebuilt and redeployed. The embodiments herein enable modification of browser JavaScript at any time with minimal downtime. The embodiments herein also externalize JavaScript control to the user and enables the users to edit the JavaScript without a need for any specialized skills. The system is fully compatible with a plurality of web applications. Further, the embodiments herein allow editing or updating the JavaScript for one internet browser by accessing the extension in another internet browser. The system is ready-to-use, lightweight and helps organizations and individuals adapt to changing applications environment in an efficient way.

Although the embodiments herein are described with various specific embodiments, it will be obvious for a person skilled in the art to practice the embodiments herein with modifications.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

What is claimed is:

1. A system for enabling single sign-on for a user on plurality of web applications through a browser extension, the system comprises:
    a receiving module configured to receive pre-determined login credentials of a plurality of web applications, and wherein the receiving module is configured to receive the login credentials of the plurality of web applications through the browser extension, and wherein the login credentials include at least a registered e-mail identity and a password, and wherein the receiving module is configured to prompt the user to enter the predetermined login credentials of the plurality of web applications for the first time;
    a parsing module configured to parse the plurality of the pre-determined login credentials of web applications login page for enabling the single sign-on, and wherein parsing of the plurality of web applications are enabled using a plurality of standard parsing techniques, and wherein the parsing module is communicably coupled with the receiving module;
    an authentication module configured to authenticate the pre-defined login credentials of the plurality of web applications, and wherein the authentication module is configured to authenticate each of the web applications by verifying the received the pre-defined login credentials with the application program interface of the web application, and wherein the authentication module is communicably coupled with the parsing module;

a generating module configured to generate an extensible markup language (XML) data and a plurality of digital scripts, and wherein the generating module generates the XML data and the plurality of digital scripts as a background process while enabling the single sign-on, and wherein the generating module is communicably coupled to the authentication module; and a database configured to store the authenticated login credentials of a plurality of web applications, and wherein the database is communicably coupled with the generating module;

wherein the receiving module is configured to receive the pre-determined login credentials of the user through an externalized JavaScript, and wherein the externalized JavaScript enables the users to edit the JavaScript without re-installing the browser extension each time.

2. The system according to claim 1, wherein the externalized JavaScript is altered optionally by a local administrator of the single sign-on, when the process of receiving the pre-determined login credentials at one web application is changed.

3. The system according to claim 1, wherein the browser extension retrieves the authentication details from a plurality of internet applications for enabling the single sign-on to each of the web application.

4. The system according to claim 1, wherein the receiving module fetches a plurality of digital scripts through a standard and secure HyperText Transfer protocol (HTTP).

5. The system according to claim 1, wherein the plurality of web applications is selected from a group consisting of a plurality of legacy applications, enterprise applications, webmails, online retail sales, online auctions, wikis, and instant messaging services.

6. The system according to claim 1, wherein the system accesses the plurality of web applications directly when the browser extension is disabled.

7. A computer implemented method comprising instructions stored on a non-transitory computer readable storage medium and run on a computing device comprising an hardware processor and a memory device for enabling single sign-on for a user on a plurality of web applications through a browser extension, the method comprises:

receiving pre-determined login credentials of a plurality of web applications through a receiving module, and wherein the pre-determined login credentials of a plurality of web applications is received through a browser extension, and wherein the pre-determined login credentials of a plurality of web applications include at least a registered e-mail identity and a password, and wherein the receiving module prompts the user to enter the login credentials of the plurality of web applications for the first time;

authenticating the received pre-determined login credentials through an authenticating module, wherein the authentication is enabled by verifying the received pre-determined login credentials with an application interface of each of the web applications;

generating an extensible markup language (XML) data and a plurality of digital scripts through a generating module, and wherein the generated XML data and the plurality of digital scripts are processed in the background while enabling the single sign-on process;

parsing the received information of the plurality of web applications to identify the pre-determined login credentials of the user, and wherein the parsing is enabled through a parsing module, and wherein the received information is parsed through a plurality of standard parsing techniques; and storing a plurality of details related to the single sign-on at a storage database, and wherein the plurality of details include login credentials of the user and metadata of the user;

wherein the pre-determined login credentials are received through an externalized JavaScript, and wherein the externalized JavaScript enables the user to edit the JavaScript without re-installing the browser extension each time.

8. The method according to claim 7 further comprises altering the externalized JavaScript optionally by a local administrator of the single sign-on application when the web application changes the process of receiving the login credentials.

9. The method according to claim 7 further comprises retrieving the authentication details from a plurality of internet applications for enabling the single sign-on to each of the web application.

10. The method according to claim 7 further comprises fetching the plurality of digital scripts through a standard and secure Hyper Text Transfer Protocol (HTTP).

11. The method according to claim 7, wherein the plurality of web applications is selected from a group consisting of legacy applications, enterprise applications, webmails, online retail sales, online auctions, wikis, and instant messaging services.

12. The method according to claim 7 further comprises accessing the plurality of web applications directly when the browser extension is disabled.

* * * * *